United States Patent

Weinländer

[11] Patent Number: 5,991,858
[45] Date of Patent: *Nov. 23, 1999

[54] MULTI-USER DATA PROCESSING SYSTEM WITH STORAGE PROTECTION

[75] Inventor: Markus Weinländer, Happburg, Germany

[73] Assignee: Siemens Aktiengesellschaft, Munich, Germany

[*] Notice: This patent is subject to a terminal disclaimer.

[21] Appl. No.: 08/913,280

[22] PCT Filed: Mar. 7, 1996

[86] PCT No.: PCT/DE96/00407

§ 371 Date: Dec. 31, 1997

§ 102(e) Date: Dec. 31, 1997

[87] PCT Pub. No.: WO96/28782

PCT Pub. Date: Sep. 19, 1996

[30] Foreign Application Priority Data

Mar. 10, 1995 [DE] Germany ............... 195 08 723

[51] Int. Cl.⁶ ...................................................... G06F 12/14
[52] U.S. Cl. ........................... 711/163; 711/153; 711/152
[58] Field of Search ........................... 711/152, 153, 711/163, 164, 173, 5; 395/188.1, 186, 187.01; 713/200, 201, 202; 235/380, 492

[56] References Cited

U.S. PATENT DOCUMENTS

| | | | |
|---|---|---|---|
| 3,742,458 | 6/1973 | Inoue et al. ........................... | 711/154 |
| 5,230,070 | 7/1993 | Liu ......................................... | 711/145 |
| 5,500,949 | 3/1996 | Saito ...................................... | 711/100 |
| 5,584,017 | 12/1996 | Pierce et al. ........................... | 711/146 |
| 5,848,435 | 12/1998 | Brant et al. ............................ | 711/152 |

FOREIGN PATENT DOCUMENTS

| | | |
|---|---|---|
| 04 49 255 A1 | 10/1991 | European Pat. Off. . |
| 05 61 509 A1 | 9/1993 | European Pat. Off. . |
| 41 15 152 A1 | 11/1992 | Germany . |

*Primary Examiner*—Eddie P. Chan
*Assistant Examiner*—Hiep T. Nguyen
*Attorney, Agent, or Firm*—Kenyon & Kenyon

[57] ABSTRACT

A data processor is adapted, in particular with respect to the microcode, in such a way that the execution of standard commands of the processor which are loaded in a user memory area and request reading or writing access to the content of memory cells is inhibited. In the operating system memory area there is a memory area access table, in which there is stored the address area authorized per user memory area for the commands there. Finally, there is an additional program routine which is called up by a command loaded in a user memory area and requesting reading or writing access to a memory cell, and checks by means of the memory area access table (before execution) whether the requested access to a memory cell lies in the authorized address area. If it does not lie in the authorized address area, the additional program routine inhibits the execution of the command. The invention has the advantage that the "radius of action" of one or more application programs in the user program memory area can be restricted in a simple way.

3 Claims, 1 Drawing Sheet

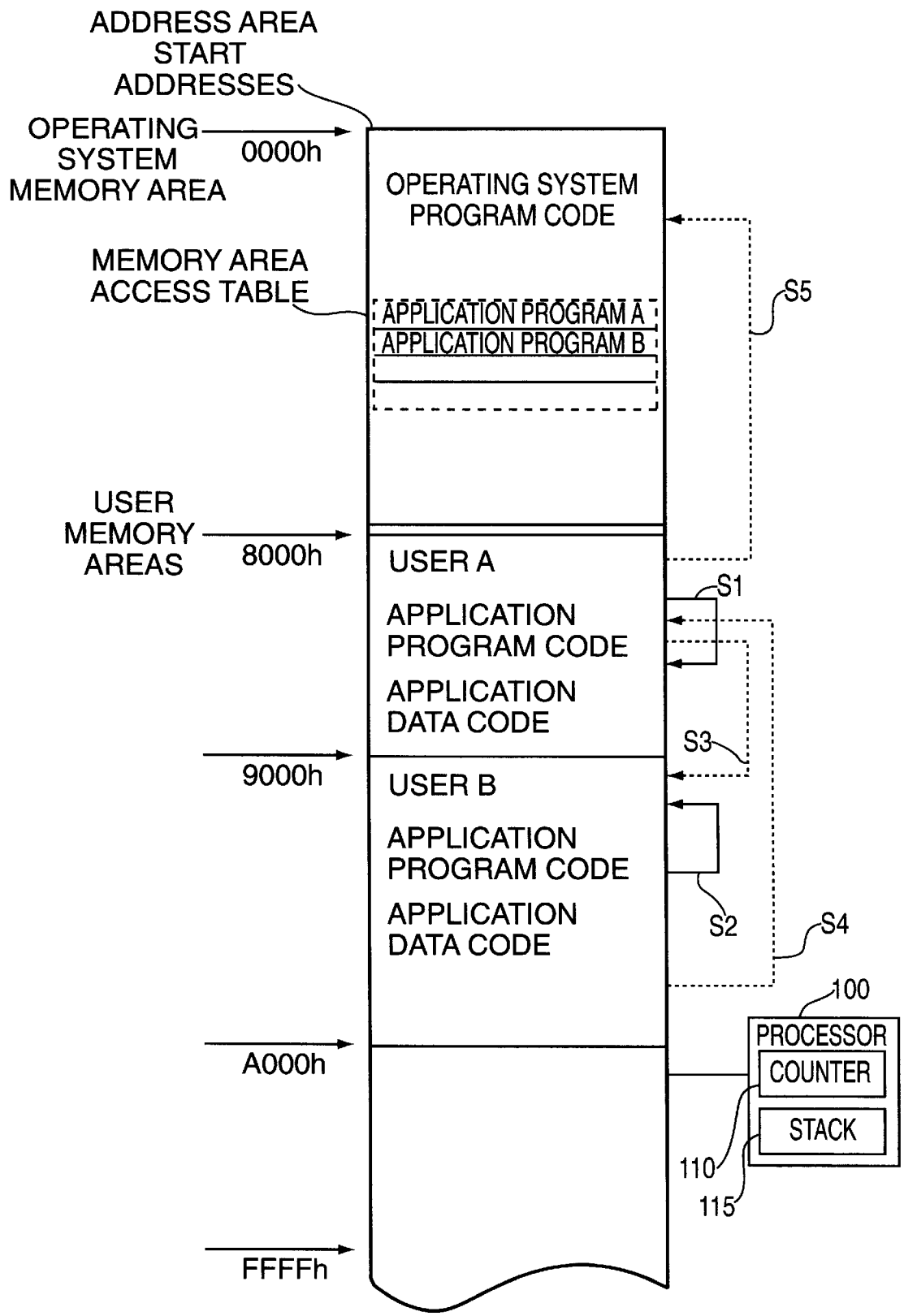

MULTI-USER DATA PROCESSING SYSTEM WITH STORAGE PROTECTION

FIELD OF THE INVENTION

The present invention relates to a data processing and memory access system which protects a memory from unauthorized reading and writing interventions in the memory.

BACKGROUND INFORMATION

A data processing system generally has as the main resources a processor and a memory. On the one hand, the memory can store the command instructions to be processed by the processor, and on the other hand, the processor can write processing results back into the memory. Usually, the memory altogether available, i.e. addressable by the processor, is subdivided into at least two individual areas. In the first area, which is referred to in the following as the operating system memory area, there is entered during the manufacture of the data processing system a so-called operating system coding, with which, in particular, the hardware components of the system are managed. In the second area, which is referred to in the following as the user memory area, programs and data created by users of the data processing system themselves can be stored.

From the viewpoint of the processor of a data processing system, there is in fact no distinction drawn between these two memory areas. In particular, it is immaterial whether, as is the case with mobile data processing systems, such as, for example, processor chip cards, the entire address area of the microprocessor is physically divided into an unalterable memory (for example ROM) for the operating system and a non-volatile application memory (for example EEPROM). Utilizing the entire address area, if required, the processor accesses any memory element, irrespective of whether it is in the operating system memory area or in the user memory area. However, this has the consequence that, by means of an individual program code, i.e. user command instructions which have been stored by a user in a user memory area reserved for him of the mobile data processing system, both the operating system memory area and user memory areas assigned to other users, and the user programs or user data installed there, can be accessed unhindered in a reading and/or altering manner intentionally or coincidentally.

In EP 05 61 509 A1 there is represented a networked computer system with a multiplicity of user terminals and input and output interfaces. The computer system is operated by an operating system, such as for example a UNIX operating system instruction set. In the computer system, operating system commands intended for users for input and output interfaces can generally be inhibited. Monitored by the operating system, they can be called up or activated by a user of the computer system by an additional operating system command if the said user has an access authorization stored in a memory.

In DE 41 15 152 A1, a data-protecting microprocessor circuit for portable data media is disclosed. This circuit contains an additional protective circuit, decoupled from the actual microprocessor circuit, which ensures that an unknown program can access only those memory areas which are authorized for access. In this case, in a first embodiment, the additional protective circuit contains a first comparator with auxiliary register and a second comparator with auxiliary register. The user-dependent limit values for accesses to memory areas are stored either in hard-wired logic or in safe memories and are loaded into the auxiliary registers by the actual microprocessor circuit. These limit values are compared by the comparators with the address register and the program counter of the actual microprocessor circuit. The output values of the comparators are logically combined by an AND gate and passed to the control circuit of the actual microprocessor circuit. In a second hardware variant, the additional protective circuit contains an own back-up processor with frequency clock dividing circuit and own memory arrangement. In the latter, the user-dependent limit values for accesses to memory areas are stored and are compared by the back-up processor with the address register and the program counter of the actual microprocessor circuit.

SUMMARY OF THE INVENTION

The present invention is thus based on the object of specifying access protection for a portable chip card memory which operates as far as possible without any intervention in the hardware structures of the chip card.

The object is achieved by, first of all, the processor being adapted, in particular with respect to the internal microcode, in such a way that the execution of standard commands of the processor which are loaded in a user memory area and request reading or writing access to the content of memory cells is inhibited. In the operating system memory area there is, furthermore, a memory area access table, in which there is stored per user memory area the authorized address area for the commands loaded in the respective user memory area. Finally, in the operating system of the processor there is an additional program routine which is called up by a command loaded in a user memory area and requesting reading or writing access to a memory cell, and checks by means of the memory area access table before command execution whether the access to a memory cell requested by the respective command lies in the authorized address area, and otherwise inhibits the execution of the command.

The invention has the advantage that the "radius of action" of one or more application programs contained in the user program memory area can be restricted in a simple way by software means alone to a specific area of the memory of the data processing system, without additional hardware components being required. The address area of the memory enabled for writing and reading accesses of commands of a user program can be stored user-dependently in the memory area access table. Generally, the authorized address area will coincide with the user memory area made available to a user and containing an individual user program code. Consequently, a user is denied writing and reading accesses by means of his user program code from the user program memory area assigned to him to memory cells which lie either in the user memory area assigned to another user or in the operating system memory area.

BRIEF DESCRIPTION OF THE DRAWINGS

The FIGURE illustrates an exemplary memory arrangement according to the present invention.

DETAILED DESCRIPTION

The FIGURE shows an exemplary division of the memory of a data processing system, also referred to as memory layout. In this case, the memory is essentially divided into two parts. An upper, so-called operating system memory area, the address area of which begins at the start address 0000h (h=hexadecimal coding), serves for receiving the operating system code. The operating system essentially organizes the controlling of the microprocessor 100, the operation of any further resources of the data processing system there are and the accesses to the memory. An adjoining user memory area, the address area of which in the example represented begins at a start address 8000h (h=hexadecimal coding), serves for receiving the application program and application data codings of generally various users. This memory area is consequently divided itself into individual subareas. In the example of the FIGURE, two such sub-areas are represented. One area, extending for example from the start addresses 8000h to 8FFFh, is provided for a user A for receiving a user program code and user data code. An adjoining area, extending from the start addresses 9000h to 9FFFh, is provided for a second user B, likewise for receiving a user program code and user data code. From the following start address A000h to the end of the memory, with the address FFFFh, there may adjoin sub areas assigned to further users.

In the example represented, consequently the user A, for example, to whom the user memory area in the address area from 8000h to 8FFFh has been assigned, can, on account of a user program code installed therein, access only user data of which the code is likewise stored in cells of which the address area extends from the starter address 8000h to the end address 8FFFh. This is ensured according to the invention by a corresponding entry in the cell of the operating system memory area denoted by "user program A" in the memory area access table. In the example of the FIGURE, this is represented by a permissible program branch of the user program code A, denoted by S1, represented by a solid line and directed forwards, within the own user program memory area. All other program branches extending from this user program memory area, for instance a branch S5 extending into the operating system memory area or a branch S3 extending into the neighboring user program memory area of the user A having the range width 9000h to 9FFFh, are impermissible and are consequently not executed. These are respectively represented in the FIGURE by a dotted line.

In the same way, with the application program code installed by a further user B in the user program memory area from 9000h to 9FFFh, it is only possible to execute reading or writing accesses to memory cells lying within the own user program memory area, for example the backwardly directed program branch S2. An access originating from this user program memory area and directed at the memory area of the user A, represented in the FIGURE by a dotted line S4, are likewise impermissible and can be prevented according to the invention.

The adaptation of the processor 100 with respect to its internal microcode is advantageously performed in such a way that, before the execution of standard commands of the processor 100 which request reading or writing access to the content of memory cells, first of all the current content of the program counter 110 of the processor 100 belonging to the respective standard command is checked. This "points" as it were to the source address of the command currently awaiting execution. If the situation arises in which the content of the program counter 110 refers to the address of a memory cell lying in the operating system memory area, the command is thus, for example, an integral part of the operating system, the execution of the command is enabled. If this is the case, the origin of the command is consequently not user-dependent but system-dependent. If, on the other hand, the situation arises in which the content of the program counter refers to the address of a memory cell lying in the user memory area, the execution of the command is inhibited. In this case, the source of the command is clearly user-dependent.

According to the present invention, the execution of such commands is made possible in an indirect way via the program routine present in the operating system of the processor 100. This routine is advantageously designed in such a way that first of all the current content of the stack 115 of the processor 100 belonging to the respective command requesting reading or writing access to a memory cell is checked. Contained in this stack 115 is the return address of the command, which likewise reflects the "source" of the command awaiting execution. Then, the entry belonging to the content of the stack in the memory area access table is compared with the access to a memory cell requested by the respective command. If the situation arises in which the requested access refers to a memory cell lying outside the authorized address area contained in the memory area access table, the execution of the command is inhibited, otherwise it is enabled.

A data processing system according to the present invention is suitable in particular for mobile use, since specifically in that case concurrent use by a plurality of users is often necessary. Each user can in this case use the data processing system undisturbed by possible other users and without adverse effects, possibly only unintentional, on the programs and data of the other users. In particular, the data protection of the users among one another is safeguarded. Unauthorized, possibly also unprofessional, reading and writing interventions in the operating system by an application program code installed in a user program memory area are prevented. Particularly suited as mobile data processing systems according to the invention are processor chip cards.

What is claimed is:

1. A portable chip card comprising:

a memory, the memory including an operating system memory area and at least one user memory area; and a processor, the processor operating in accordance with a code so as to inhibit execution of processor standard commands which are loaded in the at least one user memory area and which request access to the contents of one or more memory cells, wherein:

a memory area access table is stored in the operating system memory area, the memory area access table containing, for the at least one user memory area, an authorized address area entry for the processor standard commands loaded in the respective at least one user memory area, when a processor standard command loaded in the at least one user memory area requests access to a memory cell, an operating system program routine is called, the program routine checks the memory area access table to determine whether the access requested by the processor standard command lies within the authorized address area, and the program routine inhibits the execution of the processor standard command if the access requested does not lie within the authorized address area.

2. The device of claim 1, wherein:

the processor includes a memory counter, the contents of the memory counter being indicative of a memory address of a command to be executed, the memory counter of the processor is checked before execution of a processor standard command which requests access to the contents of one or more memory cells, if the contents of the program counter indicate a memory address lying within the operating system memory area, execution of the processor standard command is enabled, and if the contents of the program counter indicate a memory address lying within the at least one user memory area, execution of the processor standard command is inhibited.

3. The device of claim 1, wherein:

the processor includes a stack, the contents of the stack being indicative of a command to be executed, the operating system program routine checks the contents of the stack before execution of a processor standard command which requests access to the contents of one or more memory cells, the contents of the stack thereby being indicative of the requesting processor standard command, the program routine compares the access requested by the requesting processor standard command to the authorized address area entry, contained in the memory area access table, for the requesting processor standard command, and if the access requested indicates a memory cell lying outside the authorized address area, execution of the processor standard command is inhibited.

* * * * *